United States Patent
Lersch et al.

Patent Number: 5,879,094
Date of Patent: Mar. 9, 1999

[54] WIPER CUSHION

[76] Inventors: Ulrich Lersch; Gregor Kohlruss; Hubert Wiesner; Oliver Griebe, all of Raiffeisenring 33/37, Bocholt, Germany, D-46395

[21] Appl. No.: 952,774
[22] PCT Filed: May 23, 1996
[86] PCT No.: PCT/EP96/02225
§ 371 Date: Nov. 21, 1997
§ 102(e) Date: Nov. 21, 1997
[87] PCT Pub. No.: WO96/37141
PCT Pub. Date: Nov. 28, 1996

[30] Foreign Application Priority Data

May 23, 1995 [DE] Germany ............... 295 08 348 U

[51] Int. Cl.⁶ ........................................ A47L 13/17
[52] U.S. Cl. ................. 401/139; 401/137; 15/244.3; 239/289
[58] Field of Search ............ 239/289; 401/137, 401/139, 138; 15/244.3; D23/42

[56] References Cited

U.S. PATENT DOCUMENTS

| | | | |
|---|---|---|---|
| 2,707,292 | 5/1955 | Lustbader | 401/139 |
| 3,603,692 | 9/1971 | Ball | 401/139 |
| 3,698,824 | 10/1972 | Lorio | 401/205 |
| 4,436,224 | 3/1984 | McInery | 401/137 |
| 5,299,876 | 4/1994 | Singarella | 401/137 |

FOREIGN PATENT DOCUMENTS

| | | |
|---|---|---|
| 760180 | 5/1971 | Belgium . |
| 813668 | 5/1959 | United Kingdom . |
| 1160995 | 8/1969 | United Kingdom . |

Primary Examiner—Henry J. Recla
Assistant Examiner—Tuan N. Nguyen
Attorney, Agent, or Firm—Collard & Roe, P.C.

[57] ABSTRACT

The invention concerns a pressure-deformable wiper cushion for wiping misted and/or dirty in particular flat surfaces such as the insides of vehicle windows. The cushion has a bag-shaped cleaning cover the outside of which during wiping comes into contact with the surface being cleaned; and a cushion filling enclosed by and filling out the cleaning cover on the inside. As a way of significantly improving the wiping effect even on dry surfaces, while maintaining ease of use, it is proposed that a container should take the place of part of the cushion filling in the cushion interior and should comprise a reservoir section and a closable neck, and that a mechanically operated spray head should be incorporated in the neck and fitted with a spray nozzle outside the cover.

11 Claims, 3 Drawing Sheets

WIPER CUSHION

The invention relates to a wiping pad deformable under contact pressure, for wiping off misty and/or dirty, in particular smooth surfaces such as, for example, the insides of automobile windowpanes, with a pouch-like cleaning cover which, during wiping, contacts the surface to be cleaned with an outer side, and with a pad filling enveloped by the cleaning cover, such filling padding the interior of the latter.

Such cleaning pads are offered by the automotive accessories trade and are used widely. It is an advantage with such wiping pads that the surface of the cleaning cover absorbs relatively large amounts of water, which is advantageous especially in connection with misted windowpanes. The wiping pads can be soaked also with a substance preventing re-misting of the windowpanes.

Soiling of the inside of auto windowpanes and other surfaces is mainly caused by adhering minute particles of dust such as, for example, particles of cigarette smoke, road dust transported into the interior of automobiles by the ventilation system, and abrasion of garments. Such dust is partly removed by the water of the mist, if any is present; however, the drawback with dry windowpanes is that it is very difficult to wipe off the coating of dirt.

The problem posed is to enhance the wiping properties of the aforementioned wiping pads in such a way that such pad is capable of producing a substantially higher wiping effect also on dry windowpanes, combined with the same simple manipulation.

Said problem is solved with a wiping pad of the type described above in that a container is mounted in the interior of the wiping pad, replacing part of the filling of the latter. Such a container has a supply part and a sealable neck and a mechanically controllable spray head installed in the neck, with the nozzle of such head being arranged outside of the cover. The container is filled with water or a water-Lenside solution, a water-alcohol solution, or, if need be, with an anhydrous cleaning solution, which can be directly sprayed onto the windowpane with the help of the spray nozzle. Accordingly, there is no need to store in the car both a supply bottle with a glass cleaner and a wiping pad. It suffices if the small bottle in the wiping pad according to the invention is refilled from time to time.

The above wiping pad is a suitable auto accessory especially on account of the Fact that suitably designed to permit its manipulation with one hand. The spray hear is preferably arranged in such a way that it laterally projects from the cover of the wiping pad, and that it can operated with one finger of the hand holding it.

For technical and ecological reasons, the spray head should be designed in the form of a pump valve. However, this is not to exclude the possibility of using a pressurized gas, by which the cleaning fluid is expelled from the spray nozzle when the spray head is actuated.

It is advantageous in this connection, furthermore, if the spray head is detachable from the container and/or exchangeable, so that the container can be refilled in a very easy way, and a long useful life can be assured.

Preferably, a suitable container is an ashlar- or egg-shaped bottle made of plastic, e.g. polyethylene.

The wiping pad should preferably have the shape of the wiping pad known per se, i.e., the form available on the market. However, it is possible to deviate from said shape, for example by designing the wiping pad in a round, lens-shaped form with a suitably shaped container.

The material of the cover should be selected by the expert in a way familiar to him per se for compatibility with the cleaning liquid and for high absorption of dirt without having to wash the cover itself or to replace it immediately. Suitable for this purpose are preferably fleece materials manufactured based on polyamide or polyurethane. Other fleece materials (non-wovens) are suitable as well.

Furthermore, covers consisting of a velour or terry cloth or knitted terry fabric at least on one wiping side were found to be suitable. Textiles (fleeces, fabrics, knits) produced from a microfiber material are also suitable for use on at least one wiping side of the cover. Microfibers are understood to be chemical fibers of the finest fiber quality, particularly chemical fibers based on polyamide or polyester spun in the finest way, with an unusually fine individual count. Such fibers can be processed both to fleece materials and textile cloths or fabrics.

In particular, it is proposed to produce the two sides of the pad from different materials, for example one side from terry cloth for precleaning, and tho other side from fleece for after- and final cleaning.

When selecting the materials for the cover and the padding, it is important that the selected materials are washable after the bottle has been removed. Therefore, suitable padding materials are, for example, foam materials based on polyethylene, PVC, or PUR.

In an advantageous embodiment of the wiping pad according to the invention, the cover has a closure and it is exchangeable. When the cleaning cover is dirty or very worn, it can be removed and replaced by a new cover, whereas the container and the filling of the pad are reusable. The dirty cover can then be washed individually and mounted again on the pad filling. Furthermore, different cleaning covers can be stored for different cleaning jobs and used as required.

The closure, for example, may be a zipper.

In a preferred embodiment of the invention, the closure is a plane slide fastener, which permits quick and uncomplicated replacement of the cover.

The proportion of the container versus the padding of the cover may be variable. However, it seems important that the wiping pad is still adequately deformable versus the mostly plane and smooth surface. The ratio between the volume of the container and the volume of the filling is determined depending on the elasticity and compressibility of the padding and the bottle, the overall size of the pad, and also the properties of the material of the cover, i.e., it is not to be excluded that the container substantially occupies the entire interior of the cover if, for example, the latter is very soft and hairy and flexible, so that it assumes also the properties of the padding.

An exemplified embodiment of the invention is shown in the drawing, in which the figures show the following:

Figure 1:
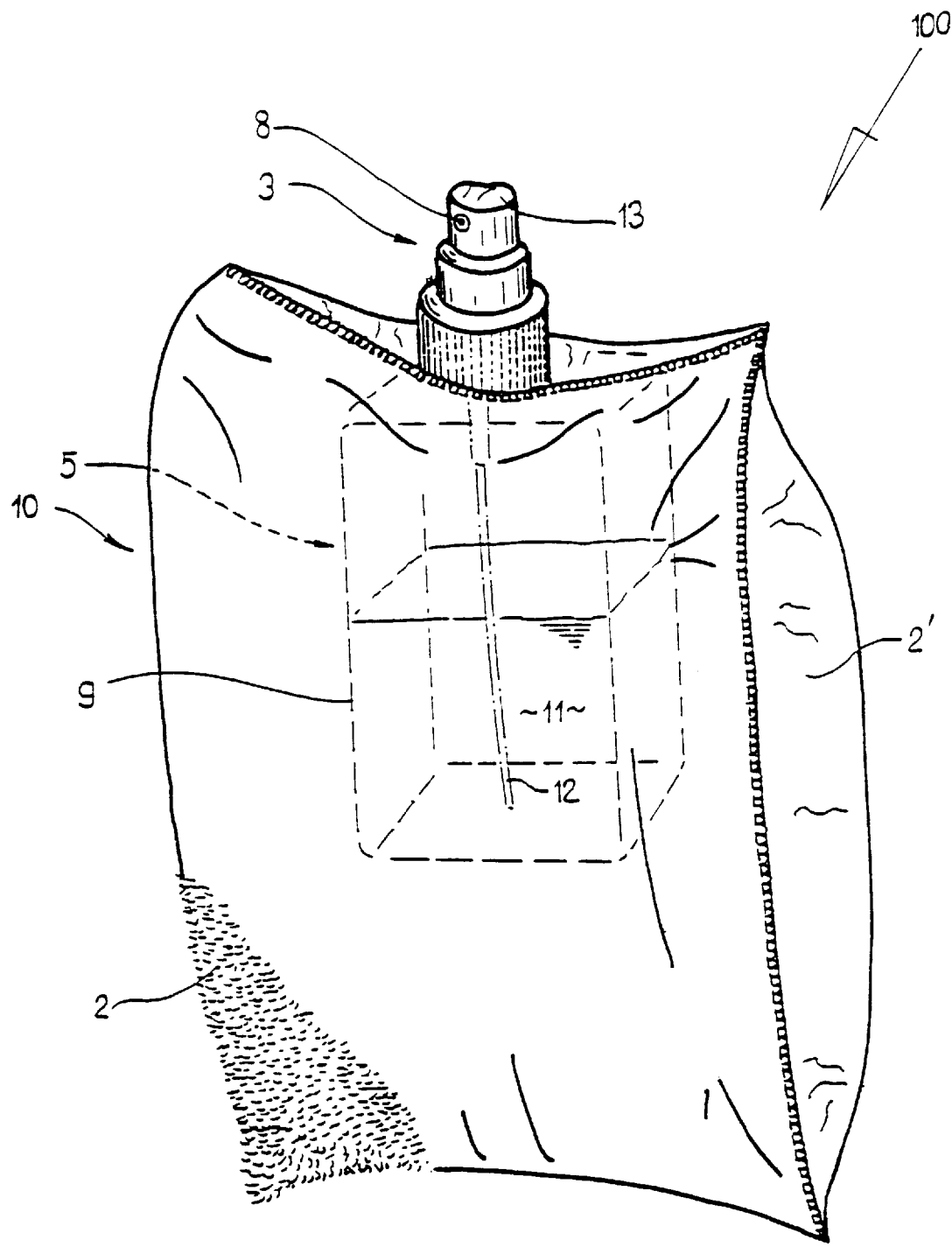
FIG. 1 shows a perspective view of a wiping pad in about the actual size.
Figure 2:
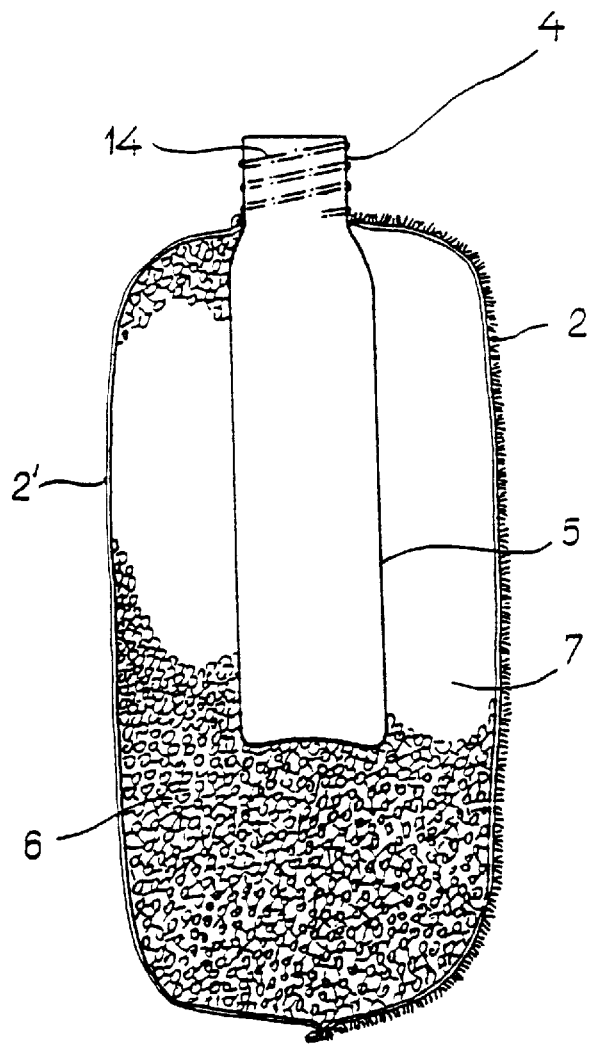
FIG. 2 shows a sectional view of the wiping pad according to FIG. 1; however, with omission of the spray head.

FIGS. 1 and 2 show a wiping pad 100 deformable under contact pressure, for wiping off misty and/or dirty insides of automobile windows (not shown) or other similar surfaces, whereby in FIG. 1, the size corresponds approximately with the actual size. However, this is not to exclude that the wiping pads may also be larger or smaller and, if need be, may also have another shape, for example a round lens shape.

The wiping pad has a pouch-like cleaning cover 10 which, during wiping, contacts the surface to be cleaned with an outer side 2 or 2'. For padding, the pad is provided with a pad filling 6 which, for example, consists of soft foam, synthetic foam chips or the like, substantially padding the interior 7. The pad filling 6 is substantially rectangular-shaped having an oval cross-section.

Furthermore, a container 5 occupies part of the interior, said container having an approximately broad stone-shaped or rectangular-shaped with an oval cross-section reservoir part 9 and a sealable neck 4 adjoining said part. The container, therefore, represents a plastic, substantially non-compressible bottle which, in the present case, holds about 100 to 250 ml of a cleaning liquid denoted by reference numeral 11. Within the container, the cleaning liquid is conveyed with a hollow tube 12 to a spray head 3 screwed to neck 4, said spray head being designed in the form of a valve spray head known per se, whereby valve head 13 actuates the valve and also contains a spray nozzle 8. Spray nozzle 8 ejects cleaning liquid 11 laterally, as shown in FIG. 1. It has to be stressed in this connection that the spray head can be operated with one finger (not shown) as the wiping pad is being held with one hand.

As shown by the representation of the neck in FIG. 2, the spray head can be unscrewed via a thread 14; in other words, it is detachably and replaceably connected with container 5. In addition, provision can be made for a protective cap (not shown), as this is known with spray heads of the type shown.

It is important, furthermore, that the materials of the cover are selected as required so as to conform to the enhanced wiping properties and the permanent availability of a cleaning liquid. It is proposed in this connection that one outer side, wiping side 21, is produced from a fleece based on polyamide, whereas the opposite side, wiping side 2, consists of a dirt-absorbing terry cloth fabric or knit. Velours, fabrics with tufts or the like can be used here as well. It is possible also to produce the cover at least on one wiping side from a textile material produced from microfibers, as mentioned herein above.

Figure 3:
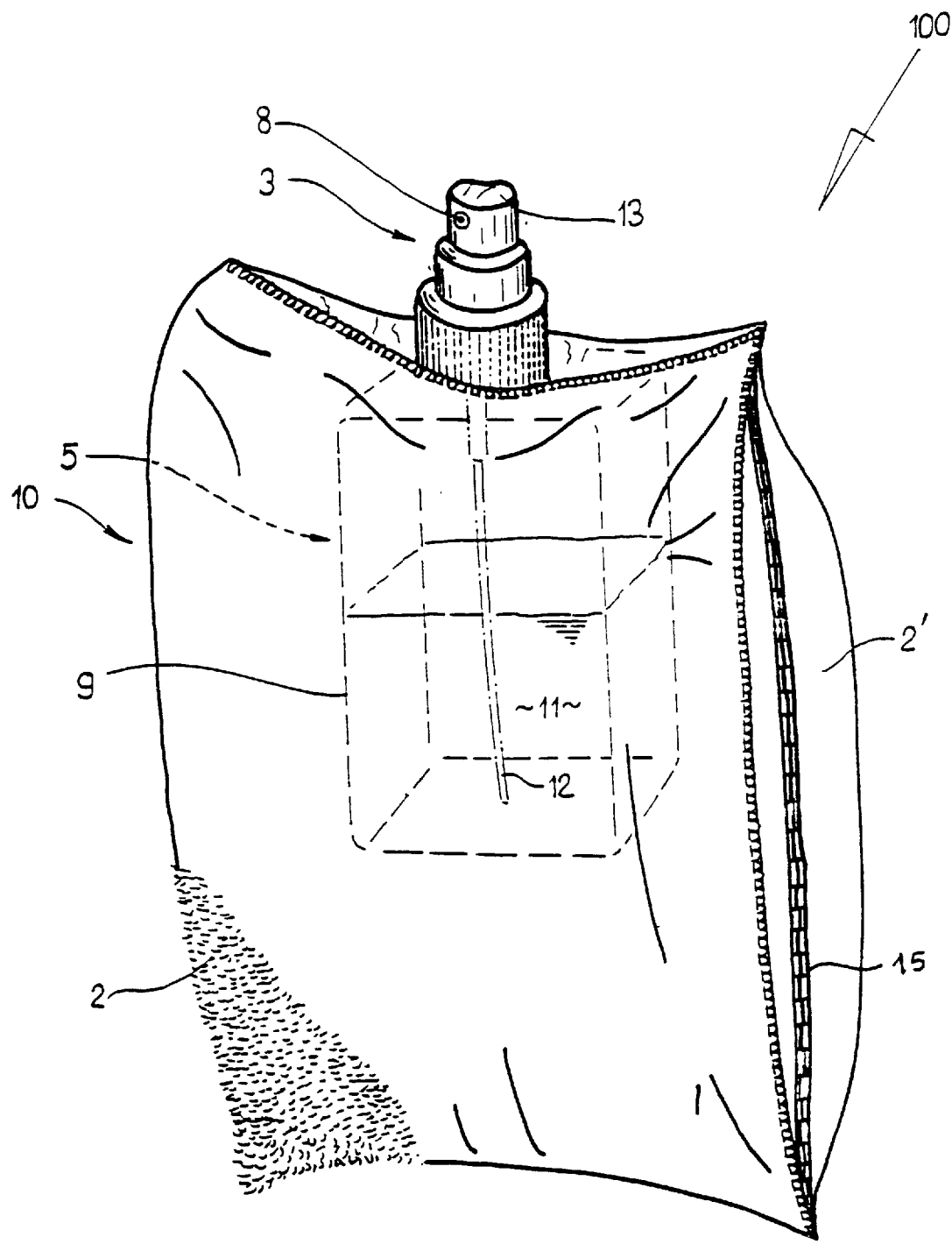
FIG. 3 shows an embodiment of the wiping pad according to the invention, in which the cleaning cover has a closure and is exchangeable.

A particularly advantageous embodiment of the wiping pad according to the invention is shown in FIG. 3. In this embodiment of the invention, cleaning cover 10 has a closure 15, the latter preferably being designed in the form of a zipper or plane slide fastener. Particularly advantageous is the use of a Velcro-type fastener, for example in the form of a sewn-on ribbon.

When cleaning cover 10 is worn and its cleaning effect is thus reduced, or if cover 10 has to be exchanged because it is dirty, it can be removed by opening closure 15 and removing pad filling 6 together with container 5. In the exemplified embodiment shown in FIG. 3, provision is made for closure 15 on one side of cover 10. It is possible also to fit two sides with a closure, which facilitates removal of the pad filling. If closure 15 is arranged on the side of cover 10 where container 5 is mounted, the latter can be removed or replaced without removing pad filling 6 from cover 10.

Overall, the wiping pad supplies a surprisingly useful solution for the aforementioned purpose of use.

We claim:

1. Wiping pad (100) deformable under contact pressure, for wiping off misted and/or dirty smooth surfaces, in particular the inside of automobile windowpanes,
    with a pouch-like cleaning cover (10) which, during wiping, contacts the surface to be cleaned with an outer side; and with
    a pad filling (6) enveloped by the cleaning cover and padding the interior (7) of said cover;
    characterized in that a container (5) is inserted in the interior of the wiping pad, replacing part of the pad filling (6), such container having a reservoir part (9) and a sealable neck (4); and that a mechanically controllable spray head (3) is installed in the neck, with the spray nozzle (8) of said spray head being arranged outside of the cover.

2. Wiping pad according to claim 1, characterized in that the spray head (3) projects laterally from the cover (10) of the wiping pad (100), said spray head being controllable with one finger as the wiping pad is being held with one hand.

3. Wiping pad according to claim 1, characterized in that the spray head (3) is detachable from the container and/or exchangeable.

4. Wiping pad according to claim 1, characterized in that the container (5) is a preferably rectangular-shaped bottle made of plastic.

5. Wiping pad according to claim 1, wherein the pad filling is substantially rectangular-shaped having an oval cross-section.

6. Wiping pad according to claim 1, characterized in that the cover (10) consists of a fleece produced based on polyamide at least on one wiping side (2; 2').

7. Wiping pad according to claim 1, characterized in that the cover (10) consists of a velour or terry cloth fabric or knit at least on one wiping side (2; 2').

8. Wiping pad according to claim 1, characterized in that the cover (10) consists of a textile material (fleece or fabric or knit) produced from microfibers at least on one wiping side.

9. Wiping pad according to claim 1, characterized in that the cover (10) has a closure and is exchangeable.

10. Wiping pad according to claim 9, characterized in that the closure is a zipper.

11. Wiping pad according to claim 9, characterized in that the closure is a plane slide fastener.

* * * * *